United States Patent
Weston (10) Patent No.: US 12,280,309 B2
(45) Date of Patent: Apr. 22, 2025

(54) SYSTEM FOR PROVIDING AN IMMERSIVE EXPERIENCE USING MULTI-PLATFORM SMART TECHNOLOGY, CONTENT STREAMING, AND SPECIAL EFFECTS SYSTEMS

(71) Applicant: INFINITE KINGDOMS LLC, Wakefield, RI (US)

(72) Inventor: Denise Chapman Weston, Wakefield, RI (US)

(*) Notice: Subject to any disclaimer, the term of this patent is extended or adjusted under 35 U.S.C. 154(b) by 1047 days.

(21) Appl. No.: 16/657,158

(22) Filed: Oct. 18, 2019

(65) Prior Publication Data
US 2020/0125031 A1 Apr. 23, 2020

Related U.S. Application Data

(60) Provisional application No. 62/748,067, filed on Oct. 19, 2018.

(51) Int. Cl.
*A63F 13/25* (2014.01)
*A63F 13/215* (2014.01)
(Continued)

(52) U.S. Cl.
CPC ............ *A63F 13/25* (2014.09); *A63F 13/215* (2014.09); *A63F 13/45* (2014.09); *G02B 27/18* (2013.01);
(Continued)

(58) Field of Classification Search
CPC .......... A63F 13/25; A63F 13/28; A63F 13/45; A63F 13/215; G03H 1/02; G02B 27/18;
(Continued)

(56) References Cited

U.S. PATENT DOCUMENTS 1,957,947 A * 5/1934 Dreyfuss .................. E04H 3/10
52/6
3,313,068 A * 4/1967 Guedes ..................... E04H 3/10
352/69
(Continued)

FOREIGN PATENT DOCUMENTS

CA          2330292 A1 * 11/1999
CN       104253989 A  * 12/2014  ............ H04N 13/00
(Continued)

OTHER PUBLICATIONS

"Campfire Creepers—A thrillingly immersive horror anthology around a campfire." Published 2018. Source: https://rafael-pavon.com/campfire/ (Year: 2018).*
(Continued)

Primary Examiner — Steven J Hylinski (57) ABSTRACT

The immersive, interactive system according to the present disclosure employs interconnected hardware, firmware, software, and mixed technology comprising projection systems, smart entertainment technologies, tracking systems, sound, light, visual displays, and other physical and/or special effect displays to create an entertainment experience that brings people together to enjoy a common story, theme, music, or game. In one embodiment, the system takes the form of a magical campfire that interacts with members of the audience to present an interactive and customized visual and audio display and story. The system may connect and interact with other technological platforms and smart devices to supplement the processing and experience, and may be updated to maintain relevant and timely content, and add additional features. The system may exist in a large scale environment, such as a theatre, theme park, or museum, or may be condensed to a smaller-scale version for home use.

6 Claims, 7 Drawing Sheets

(51) Int. Cl.
  A63F 13/45    (2014.01)
  A63F 13/52    (2014.01)
  G02B 27/18    (2006.01)
  G03B 21/56    (2006.01)
  G06T 19/00    (2011.01)
  A63F 13/53    (2014.01)
  A63F 13/55    (2014.01)
  A63F 13/60    (2014.01)
  G03B 21/00    (2006.01)
  G03B 21/60    (2014.01)
  G06V 40/20    (2022.01)
  H04N 9/31     (2006.01)

(52) U.S. Cl.
  CPC .......... *G06T 19/006* (2013.01); *A63F 13/52* (2014.09); *A63F 13/53* (2014.09); *A63F 13/55* (2014.09); *A63F 13/60* (2014.09); *A63F 2300/1043* (2013.01); *A63F 2300/203* (2013.01); *A63F 2300/30* (2013.01); *A63F 2300/303* (2013.01); *A63F 2300/8082* (2013.01); *G03B 21/00* (2013.01); *G03B 21/56* (2013.01); *G03B 21/60* (2013.01); *G03H 2210/63* (2013.01); *G06V 40/20* (2022.01); *H04N 9/3147* (2013.01)

(58) Field of Classification Search
  CPC .... G06T 19/006; H04N 9/3147; G03B 21/00; G03B 21/56; G03B 21/60
  See application file for complete search history.

(56) References Cited

U.S. PATENT DOCUMENTS

| | | | | |
|---|---|---|---|---|
| 3,989,362 | A * | 11/1976 | Farnum | G03B 37/00 352/69 |
| 5,264,881 | A * | 11/1993 | Brooke | G03B 21/28 353/30 |
| 5,316,480 | A * | 5/1994 | Ellsworth | A63H 33/425 434/29 |
| 5,539,483 | A * | 7/1996 | Nalwa | H04N 7/17318 348/E7.071 |
| 6,195,204 | B1 * | 2/2001 | Nalwa | H04N 7/181 348/E7.086 |
| 6,286,962 | B1 * | 9/2001 | Hennes | G03B 21/56 353/94 |
| 7,194,830 | B2 * | 3/2007 | Hess | F24C 7/004 40/428 |
| 10,169,918 | B2 * | 1/2019 | Rehmeyer | G06F 16/40 |
| 10,371,333 | B2 * | 8/2019 | Jones | F24C 7/004 |
| 2002/0174579 | A1 * | 11/2002 | Corry | F24C 7/004 40/428 |
| 2004/0017608 | A1 * | 1/2004 | Lantz | G03B 21/00 359/451 |
| 2004/0092311 | A1 | 5/2004 | Weston et al. | |
| 2015/0209664 | A1 | 7/2015 | Haseltine | |
| 2015/0283460 | A1 * | 10/2015 | Huang | A63F 13/00 345/158 |
| 2016/0063876 | A1 | 3/2016 | Javidan et al. | |
| 2016/0343173 | A1 * | 11/2016 | Mullins | G06F 3/011 |
| 2017/0091983 | A1 * | 3/2017 | Sebastian | G06T 1/60 |
| 2017/0296855 | A1 * | 10/2017 | Williamson | A62C 99/0081 |
| 2017/0372518 | A1 | 12/2017 | Rehmeyer et al. | |

FOREIGN PATENT DOCUMENTS

| | | | | |
|---|---|---|---|---|
| JP | H0759945 A | * | 3/1995 | |
| WO | WO-2016086235 A1 | * | 6/2016 | ............... A63J 1/00 |

OTHER PUBLICATIONS

"Campfire Creepers—Available now on the Oculus Store," published Apr. 20, 2018. Source: https://www.darkcornerstudios.com/campfire-creepers (Year: 2018).*

"34th International Short Film Festival Berlin 2018—Campfire Creepers: Midnight March." Published 2018. Source: https://www.interfilm.de/en/interfilm-festival/films/campfire-creepers-midnight-march/ (Year: 2018).*

"Brown's new VR display aids scientific, artistic exploration," by Kevin Stacey, published Dec. 1, 2015. Source: https://news.brown.edu/articles/2015/12/yurt (Year: 2015).*

"Schlock and Awe: 'Campfire Creepers' Delivers Classic 1980s Horror—AvailableNow on Rift and Gear VR". Published Apr. 21, 2018. Source: https://www.meta.com/blog/quest/schlock-and-awe-campfire-creepers-delivers-classic-1980s-horror-available-now-on-rift-and-gear-vr/?srsltid=AfmBO%E2%80%A6 (Year: 2018).*

"Tribeca Film Festival's Virtual Arcade Steps Up VR Game For 2018," by Kyle Melnick, published Apr. 23, 2018. Source: https://vrscout.com/news/tribeca-film-festival-virtual-arcade-vr-2018/ (Year: 2018).*

Notification of Transmittal of the International Search Report and the Written Opinion of the International Searching Authority (Forms PCT/ISA/220, PCT/ISA/210, and PCT/ISA/237) issued on Dec. 19, 2019, in the corresponding International Application No. PCT/US2019/056989. (11 pages).

* cited by examiner

SYSTEM FOR PROVIDING AN IMMERSIVE EXPERIENCE USING MULTI-PLATFORM SMART TECHNOLOGY, CONTENT STREAMING, AND SPECIAL EFFECTS SYSTEMS

TECHNICAL FIELD

This disclosure generally relates to integrating software, tracking, and hardware technology, including sound, lights, and projection, and connecting devices for gaming or smart entertainment attractions, retail mass-market product as well as to create a special effects centerpiece for telling a story, including through songs, play, story, games and cooking.

BACKGROUND

The experience of gathering around a campfire to provide light, keep harm away, sing songs, hear stories, play games, roast marshmallows, educate, pass on traditions, connect and be warmed goes back in time.

Fake campfires exist to provide rock formations and other design elements to mimic a campfire. Some of these fake campfires have special effects, including control lighting or fog, but are limited in the special effects they can provide.

The present invention relates to a system providing a special effect system that may look like a campfire (or other themed device such as crystals, etc.) and that provides a sound system, visual effects, a projection system, etc. The system is outfitted with smart hardware, firmware, and software to enable it to download and play theatrical stories, games, sing-alongs, music, and more. The system may stand-alone on its own technology platform and/or connect to an open platform technology (e.g., Alexa, Google Home, Bixby, etc.) to allow a larger system to support it. The projection technology of the present invention centers around a fake, but realistic campfire, that creates strong illusions to provide a 360° and 4D experience to users. The campfire unit uses a combination of physical and special effects, including surround sound, scent, heat, vibration, projected imagery of pre-rendered and/or real-time content, to provide the immersive experience.

At its core, the present invention is a hardware (i.e., the item that looks like a campfire) and software/technology driven-experience to provide an all-in-one smart system for connecting to different devices and downloading software to provide multiple entertainment experiences through the campfire unit. There may be different levels of production for the present invention to be used as a home version or a large-scale, theatrical version.

The present invention is a technology enabled play system that has learning aspects and interactive tease-ins that grow kids imaginations while giving families a way to connect through storytelling and games, experiences, cooking, and sing-alongs. The present invention may provide a party experience to get players around the campfire laughing and playing at any age. The present invention may provide entertainment experiences from various genres, including haunted, comic, Native American, futuristic, Sci Fi, documentary, or educational. The present invention may be a theatrical version for large-scale theatres, resorts, parks, etc. The home version has different levels of engagement and support systems. Each of these levels is upgradeable. Both the smaller scale home-version and large-scale version may have the same types of applications and features.

DETAILED DESCRIPTION OF THE INVENTION

The present invention is a replica of a real campfire for indoor or outdoor use, and covers both large-scale attractions (theme park, water park, location-based entertainment, dining, bars, children centers, shopping malls, resorts, etc.) and a mass-market "table top" product for the home in several versions, including a less expensive toy. In the example of outdoor use, the system can be made waterproof. The system is also designed to be used for educational purposes and/or museum use.

Figure 1:
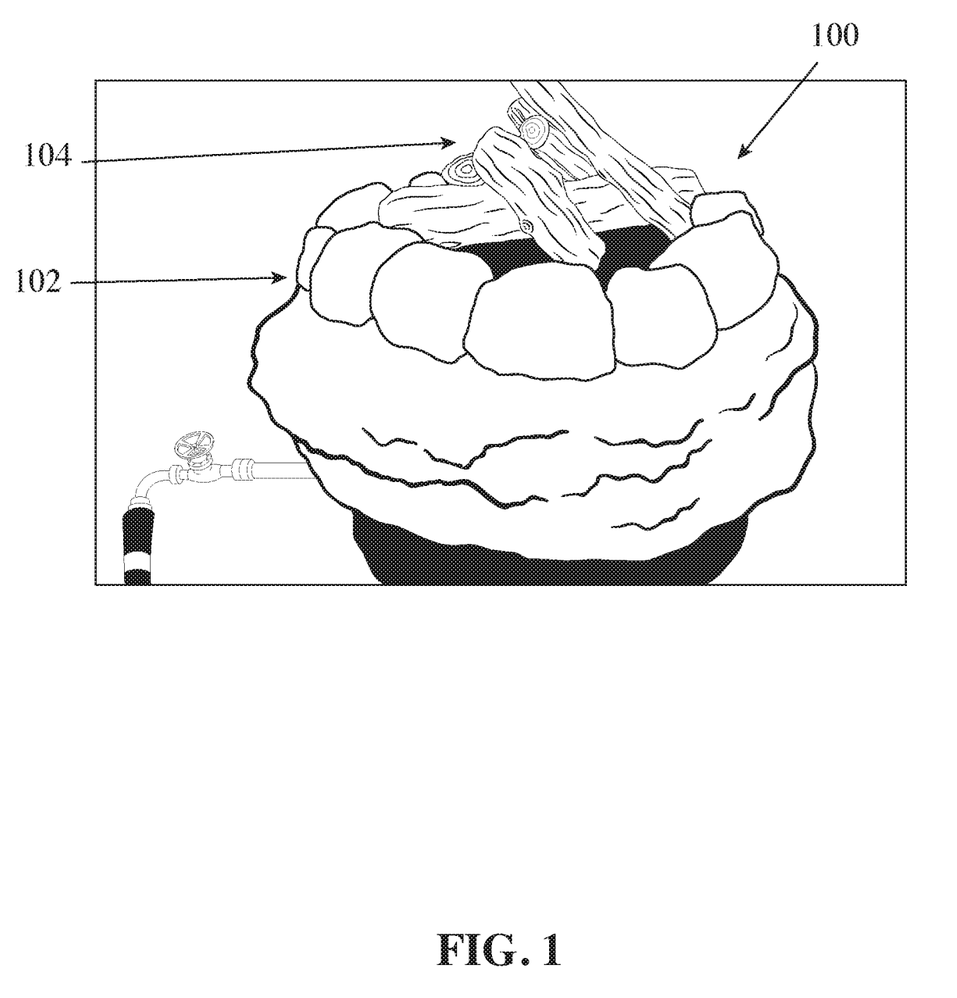
FIG. 1 illustrates an example special effects generating unit for an immersive storytelling experience in accordance with a non-limiting embodiment of the present disclosure.

As depicted in FIG. 1, the device core look is like a campfire 100 that may have a ring of rocks 102 and permanent logs 104 with an embedded LED crackling firelight (not shown) or other source of light to simulate a campfire. In one embodiment, the campfire unit 100 is a stand-alone device containing the fake campfire itself and the platform for providing the projection and various special effects to create the immersive storytelling experience of the present invention. The campfire unit 100 may include a projection system, microphone, speakers, and any other suitable hardware or software to provide special effects. In another embodiment, the campfire unit 100 may interface with another device or system, e.g., Sonos® speakers, to provide some or all of the special effects. The campfire unit 100 may interface with another device or system through any suitable input/output device or connection, including USB cables and ports in each of the campfire unit and other device, WiFi, and Bluetooth.

The campfire unit 100 may also include a computer system, processor, or other suitable device to execute a storytelling experience or perform one or more steps of a pre-programmed story, including corresponding special effects. For example, a story and sequence of corresponding audio/visual effects may be pre-programmed. Software running on the computer system or processor of the campfire unit 100 may perform the pre-programmed story, including playing the story and corresponding special effects. The computer system or processor may be built into the campfire unit 100 or the campfire unit 100 may be connected to an external computer system or processor. In particular embodiments, computer system includes a processor, memory, storage, an input/output (I/O) interface, a communication interface, and a bus. Although this disclosure describes and illustrates a particular computer system having a particular number of particular components in a particular arrangement, this disclosure contemplates any suitable computer system having any suitable number of any suitable components in any suitable arrangement. The computer system and its components will be described in more detail below with respect to FIG. 5.

In another embodiment, the campfire portion can be a form that is already created by another manufacturer (as a simple theming item with built in campfire-like effects) and an added ring (not shown) may be placed around (or otherwise connected to) the prebuilt item or show control technology. This added ring hardware system of the present invention is connected to the pre-formed element. The added ring contains the projection system and other components necessary to provide the special effects to create immersive storytelling experience of the present invention. In the embodiment of the added ring, the prebuilt item would merely provide the campfire-like effects, while the added ring would provide the special effects and storying telling experience of the present invention as described herein.

The main platform of the present invention may be an open architecture platform for content growth from the community, similar to iTunes, and would have a licensing fee for content to exist on the platform. The core platform of the present invention allows for downloadable experiences that activate the sound/show/site/visual effects system of campfire unit 100. The present invention works with pre-rendered and real time content. Content can also be streamed, curated in real time, or downloaded and played. For example, content recorded by major storytellers or people with recognizable voices may be downloaded and played by the campfire unit 100. In another example, content can be streamed from Amazon, Netflix or other streaming companies to include but not limited to stories, games, triggered effects, songs, dance cycles, etc.

The campfire unit 100 itself of the present invention would include a special effect system that resembles a campfire. However, other themed looks, such as crystals, trees, water fountains, etc., can be used. The campfire unit 100 may also have a sound system, visual effects, projection system, and any other suitable hardware or software to provide desired special effects. For example, the campfire unit 100 could include a heater. In another example, the campfire unit 100 could create effects in a 360°-surround sight and sound environment. The campfire unit 100 could also connect to virtual reality (VR) and augmented reality (AR) devices to enhance the experiences. It can be seen in the dark and in the light.

The present invention may be themed to look like a campfire (as depicted in FIG. 1), a bonfire, a fireplace, or any other suitable item, and is outfitted with smart hardware, firmware and software that enables it to download and play theatrical stories, games, sing along, music and other suitable content. The present invention may fit on a tabletop or be constructed as a large-scale attraction for one or more people. The system may have its own internal smart system, and/or it can depend on other smart systems. The unit of the present invention is created to stand alone on its own technology platform and/or connect to an open platform technology, such as Alexa, Google home, Bixby, etc., allowing for a larger system to support it. The present invention uses personalization to create and connect to a social platform to enable individuals to submit their own content. For example, musicians, gamers, storytellers can submit and download their own work to be played through the campfire unit, much like iTunes, Apps, Alexa Skill, etc.

In addition to resembling a campfire, as shown in the embodiment of FIG. 1, the present invention may be themed to resemble bonfires, crystals, futuristic light rocks, bush, tree, water fountain, moons, worlds, abstract sculptures, futuristic items, or any other suitable themed item.

The internal system of the campfire unit 100 of the present invention may be a projection system that shines light, shadows, colors, imagery, text, or other suitable content, around a room and/or ceiling, in a dome, in a ride system, in a waiting area, in a hallway, in any size room, in a theatre, on a screen or monitor, using holographic techniques, or any other suitable location for use of the present invention. For example, the content may pop up as a hologram from the campfire unit 100. Physical elements, including the projection system, microphones, speakers, sensors, including haptic or other touch-based sensors, themed effects, fog, lighting, water, wind, air, press, hologram, etc., may be incorporated into the campfire unit 100 to create an immersive experience. The system of the present invention may be adjusted to just play internally with no light and just sound, or vice versa. The present invention may be connected to TV or computer or screen and play effects, including audio and visual, on the connected system. The campfire unit may connect to the TV or computer wirelessly, for example through WiFi or Bluetooth, or may be physically connected through USB cables and ports in each of the campfire unit and other device, or other suitable wired connection.

The present invention may also be connected to multiple campfires to create a chain of experiences, such that the chain of campfires operating with the system of the present invention may be laid out across a ride or a path. The system of the present invention may be put into mazes, interactive theatres, in separate theatre rooms, etc., and the multiple systems may operate with each other or apart. The multiple campfire units may be connected wirelessly, for example through WiFi or Bluetooth, or may be physically connected through USB cables and ports in each of the campfire unit and other device, or other suitable wired connection.

The system of the present invention may be specialized as a product for kids or adults.

The campfire system of the present invention may be connected to a home system, a show control system, and other audio-visual (AV) effects, such as speakers, special effects, floor shakers, rumble seats projector systems, steam, boiler systems, fog systems, lighting systems, heat, cool/cold, fans, strobes, motion sensing, ticklers, pneumatic air, augmented reality (AR), virtual reality (VR), water, and other technology elements. These systems may be incorporated into the campfire unit itself or the campfire unit may be connected to any number of these systems wirelessly, for example through WiFi or Bluetooth, or may be physically connected through USB cables and ports in each of the campfire unit and other device, or other suitable wired connection. The campfire system of the present invention could also be used in conjunction with other hardware systems/software systems such as Magic Leap, Oculus, etc., where people are able to join the technologies together to have a layered visual, audio experience that has overlays of imagery and sound to add to the experience.

The present invention is both a hardware (retail item that looks like a campfire but has technology driven hardware for the multiple entertainment experience), technology (all-in-one smart system that connects to all kinds of devices and software downloading, wireless), and software driven experience. The technology allows for the present invention to be a social experience giving any suitable number of people, such as more/less than 20 guests, the ability to "log in" and be known in the system. The guests may be invited to a game, story, play, sing, or otherwise interact with the unit.

The present invention is multi-platform using both projection of images, shadows, glowing effects, surround sound, voice command, image recognition, and interactive participation depending on what "mode" the user selects.

The present invention is also smart and can playback moments, record, change voices (e.g., synthesize), add effects, and otherwise create ongoing interactivity and participation.

The present invention has the ability to run applications so that other experiences can be customized to be on the platform of the present invention.

Interactive wireless, Bluetooth, smart, and other technology drive the themed campfire that tells stories, projects images, has surround sound, takes voice commands, and personalizes an audio-visual effects experience to a group of users. Special audio-visual effects give the present invention a glowing experience so if the lights are turned off or the present invention is used in a dark space, everyone participating can be seen "in the round."

The present invention has the ability to know who is present around the campfire. For example, the present invention may call out to a person by name if they "log in" or by their position around the fire. The present invention could also have built in camera systems that facially recognize a person. A user of the present invention may log in by using an app or their phone or a personal ID. The campfire may also identify users through voice, facial, gesture, prop, color, graphics, RFID, IR, Unique Identification, or other personal information digitally or physically recognized, for example, by receiving input to an audio receiver, scanning device, such as a camera, an RFID or other contactless scanner, a facial recognition or biometric recognition scanning device, or manual user input, located on the campfire unit 100.

A user may control the campfire unit 100 of the present invention through any suitable mechanism, including an app, phone, computer, TV or other remote. The present invention may also be voice or gesture activated where the campfire unit 100 contains suitable audio receivers, camera, or facial recognition type software and hardware.

Figure 6:
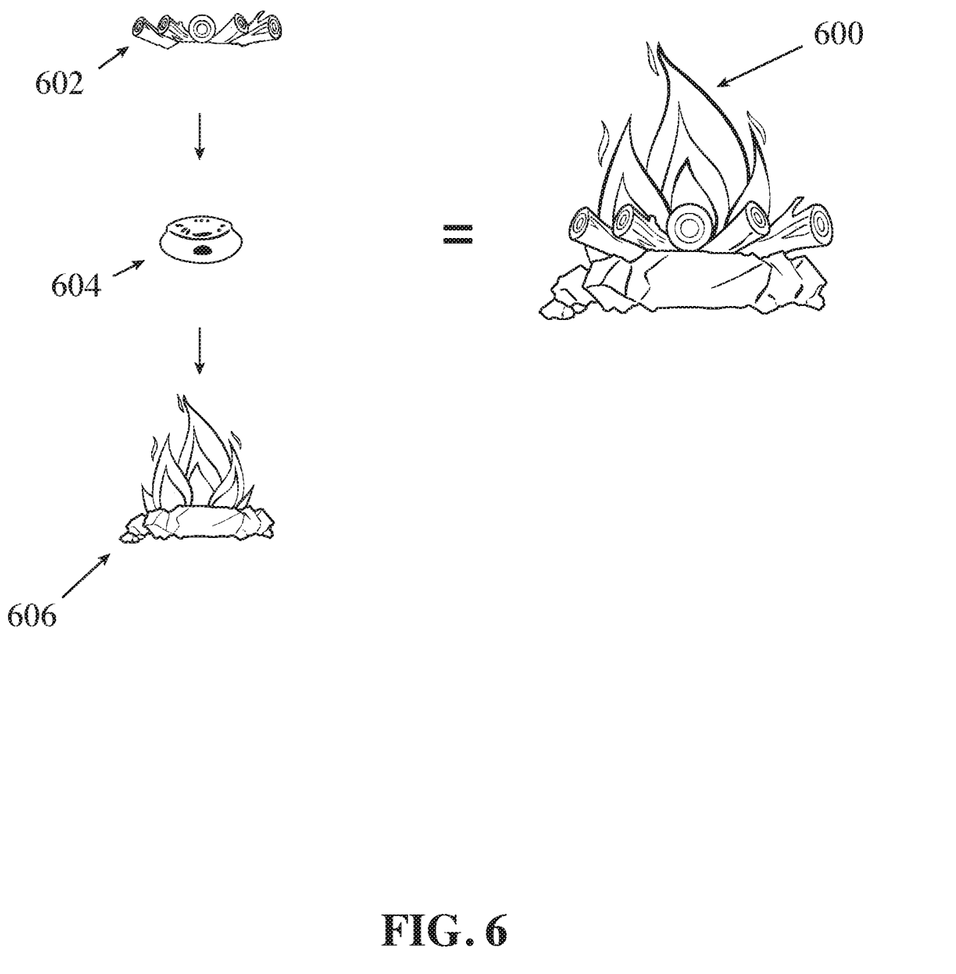
FIG. 6 illustrates example core embedded technology components that can be pieced together to create the device, stand alone or have added elements for additional experiences (i.e., projection, gamification, treasure hunts, etc.).

FIG. 6 depicts the components of the campfire unit according to embodiments of the invention. The assembled campfire unit is depicted at 600. The assembled product includes a log ring overlay 602, which may be supplemented during the immersive experience with additional individual smart log components (described below). The assembled product also includes a heating/fog/projection module 604, which may include interchangeable modules to provide alternate audio/visual and other special effects experiences. The assembled project also includes a rock ring base 606 with translucent acrylic flames (or other suitable faux flame). The base 606 may house embedded technology, such as LED lights and speakers, used to provide special effects to create the immersive experience according to the present invention.

The present invention may allow for other add-ons or features that come with the campfire, including logs, toys, additional retail, or collectibles ("Log In devices"), that fit a theme or are items that work with the campfire with embedded information, digitally, or tracked by shape, size, position or other tracking technology. These Log In devices may be physical devices that connect virtually, digitally (e.g., by WiFi or Bluetooth), or physically (e.g., via USB cable) to the unit. These Log In devices may come as an option or add on with the campfire unit 100 for both home and large-scale entertainment use. Each of these devices may have a special sound that is recognized as well by tone or way it is positioned. The sound or tone may be triggered through movement or gravity switch to send a signal to the campfire, indicating that the "log" or another device has been added. For example, the system of the present invention may come with any suitable number of Log In devices sold with the unit or in a separate package. These Log In devices may allow each user to download their information, imagery, media, the contents of their phone, other information about themselves or what they want to share via the campfire system of the present invention, including photo and visual capture. These devices may be customizable, including the ability to carve them, decorate them, add more attachments, or turn the devices into a wand, totem, staff, stick figure, puppet, shadowing device, or other suitable device.

Figure 2:
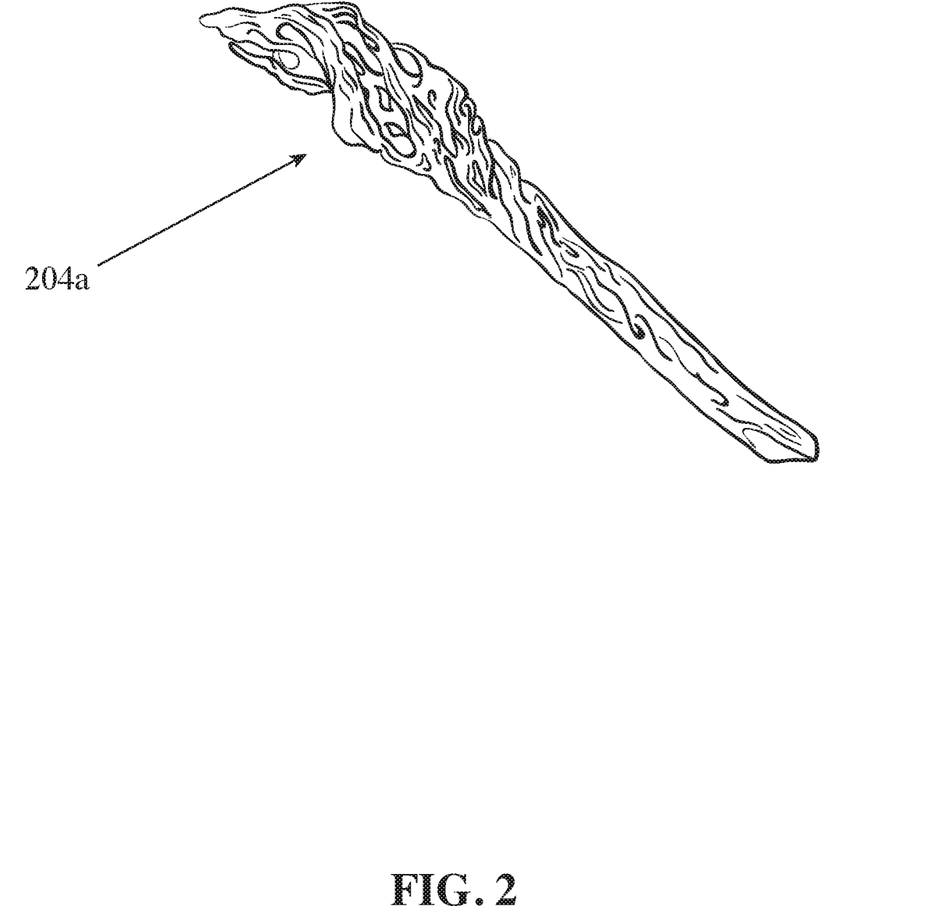
FIG. 2 illustrates an example add-on device for use with the special effects generating unit for an immersive storytelling experience in accordance with a non-limiting embodiment of the present disclosure.

As depicted in FIG. 2, the Log In device may look like an actual log 204a. The Log In device may also have any other retail form. The device 204a receives and send signals to the campfire unit 100 through technology (such as WiFi or Bluetooth) to know who each unique user is based on its shape, unique id, position or inputted information. This log can also be other objects. These other objects may be a torch and "light" (e.g., LED or some kind of added/screwed on/or build in light), or could be a crystal, a stick, magic wand, coal, leaves, twigs, marshmallow stick, hot dog, or other suitable object that is themed towards the campfire. This Log In device is then placed on the campfire system of the present invention, held by the user, or otherwise located in range of the campfire. The Log In device then transfers its information to the campfire device via any suitable technology, including WiFi, or is "seen" or heard, using any suitable technology, including the above described scanning and recognition software. For example, the Log In device may have embedded technology, such as a motion detecting sensor, so that the Log In device will activate and interact when it is waved over the campfire unit 100. The embedded technology could also use radio frequency identification device (RFID), Bluetooth objects, or Skylanders. The campfire unit 100 of the present invention may also have attachable portholes, similar to embedded RFID technology, where a user places an embedded toy on a platform, that allow people to play games in a holographic way. Any suitable number of logs 204a-n may be added to the campfire unit and log 204a-n may correspond to a different user or add a different capability to the campfire unit of the present invention depending on the user's preferences. The Log In device does not need to have technology itself, but can be image recognized by the campfire unit 100 or simply a prop.

In one example, the log 204a has personalization and the log 204a itself can be customized, carved, or have other add-ons to personalize it. When personalized log 204a is added to the fire, the campfire unit 100 of the present invention will be able to access information from the log 204a, including the user's background, the user's imagery, and can connect to the user's mobile device to add pictures or other suitable content from the mobile device to the campfire unit 100. In another example, rather than a physical device, a user may be able to have a digital "log" to put on the fire and that enables the system, i.e., it can be virtual. This digital "log" would otherwise interact with the present invention in a similar way as the physical devices. New logs or devices that advance the experience can continually be added on to the present invention to provide different functionality.

In another example, the Log In device itself may have embedded, or otherwise incorporated, technology to provide special effects, such as a speaker, LED light. In this embodiment, multiple users may each approach the campfire unit with their own personalized Log In devices. For example, 5 users may surround the campfire unit, each with a Log In device. The 5 Log In devices may be placed on the campfire unit in a typical arrangement of logs to build a fire or the Log In devices may be joined or attached to the campfire unit to form the added ring described above. For example, the Log In devices may join together or attach to the campfire unit via snap-fit, Velcro, tape or adhesive, or other suitable mechanical attachment. The Log In devices may communicate with each other and/or the campfire unit wirelessly, e.g., WiFi or Bluetooth, or through a wired connection.

The campfire system of the present invention can also pair with other devices, including mobile devices, smart TVs, Sonos® or other speaker systems, projectors (large and small scale), show control systems, and any other suitable device. The campfire unit of the present invention may connect to the mobile device or other devices described above using any and all mobile device technology options, including Bluetooth, the cloud, sensing devices, apps, etc. Other devices or objects, including musical instruments or masks, may also attach to the present invention. Puppets, including shadow puppets, that are curated before, during, or after an experience, may also be paired with the campfire system of the present invention. Game pieces can be added to the platform so live action role play (LARP) or Dungeons & Dragons type games can occur using the present invention. These other devices may attach physically to the campfire unit via appropriate cord or wired connection. These other devices may also have appropriate sensors or technology to interact with the campfire unit 100 or wirelessly communicate with the campfire unit, for example, via WiFi or Bluetooth or other suitable I/O or communication interface of the campfire unit 100.

The campfire unit 100 of the present invention may have built-in microphones to provide a karaoke capability to give others an opportunity to participate and allowing users to select background music, vocals, instruments, etc. The present invention has the ability to connect other instruments to the system, amplifying that instrument or adding to the music and sound. Synthesizing units can be added on to both the small and the large-scale campfire unit. The present invention is able to build connection points to musical instruments that allows it to be amplified and adds a karaoke-like system to the play.

In other embodiments, the campfire unit 100 could also include a printer that could print, or 3D print an object that is then used in the campfire experience. The campfire unit 100 could also connect to a printer or 3D printer. With the ability to connect to 3D printers, the present invention could make shadow puppets or other play elements to use with the campfire. This connection may be physical (e.g., using a USB or other suitable cable) or wirelessly (e.g., using WiFi or other suitable technology).

The campfire unit 100 present invention can also include cameras to capture the shadow of an individual, which is then shown in real-time by the system. The system can come with scene sets for shadow making that creates anything from tents, to the woods, to the sky, or any other suitable scene. These can then be used to contain projection and/or set the scene of the campfire. The present invention can also project imagery, such as stars at night, wildlife flying by, the outdoors, or any other suitable image. The present invention can create shadow effects, such as of people themselves in the range of the campfire unit and project those images. Images can also be projected from Facetime or other phone apps that allow users to project images of themselves in real time.

The campfire unit 100 may also connect to a surround sound system and can use surround sound to "throw sound" around the room to add drama and excitement to the campfire experience. The system may have a built-in microphone for projecting voices and enabling voice activation. The campfire unit 100 may also have audio receivers or sensors and be able to listen to sound and sense visual effects, such as a TV show, and respond to such an effect, for example by turning on and activating the campfire experience. The system could also respond with music or encourage song or interactivity or a game. For example, a TV series or app could wirelessly communicate with the campfire unit 100, which could then respond, through any suitable I/O or communication interface of the campfire unit 100.

In another embodiment, artificial intelligence (AI) smart systems may allow the campfire unit of the present invention to learn, capture and continue developing based on the user(s) choices and needs. The campfire unit of the present invention may also use augmented reality to see other images triggered by the technology.

The campfire unit and system of the present invention can also be used for educational purposes, such as a lecture experience-providing content and a TED talk-like experience around the campfire. The present invention can also be used to bring different cultures together by having stories told in different languages and from different cultures that bring people together through stories.

The campfire unit of the present invention may also have an integration feature in which people can go around the campfire and sing or tell a story one turn at a time. The integration feature may have a feedback system/software that remembers the story and uses cue words to repeat the story along with adding special effects.

The campfire unit of the present invention may connect to other Infinite Kingdoms patents including smart rooms, puppet packs, infinite tracking and Digime, as well as impact attractions and new portfolio developments.

The campfire unit of the present invention may operate as a system that connects to the goals and visions of a user. The campfire unit may allow a user to store his/her ambitions and/or needs in memory attached to the campfire unit. The campfire unit may respond to these stored ambitions and/or needs like a muse or mentor by searching for stories, music or needs of the user that relate to others who have used the system or connecting to information that inspires the user.

In another example, online dating websites, apps, or other systems can connect with the campfire unit to bring people together who have similar interests that may be on the same app in the recreation area/live event.

The campfire unit of the present invention may provide an experience connected to a real time event-connecting content and knowledge between experiences via the platform. A campfire unit does not need to be available onsite for the content to connect. In other words, a live event that happens in one location does not have to have a campfire unit to connect to the content.

Visual campfires or sound campfires can exist as streaming content but need not require a physical unit. The content can exist and play on another device without a campfire unit.

For example, a phone can be turned into a campfire unit, as well as any other suitable mobile device, tablet, TV, or projection system.

The campfire unit of the present invention can be solar powered or use other energy solutions to avoid energy consumption or need. The campfire unit of the present invention may also be powered by any other suitable mechanism, including battery or electric.

It may be packed up and can travel such that the campfire unit is portable. The present invention may also become bigger, such as bonfire-like size, for larger audiences.

The above-described operation works on everything from a table top, desk, middle of a room, bed, tent, indoors, outdoors, or large-scale attraction, including those that are massive in size and can fill spaces as large as event or convention centers.

Figure 7A:
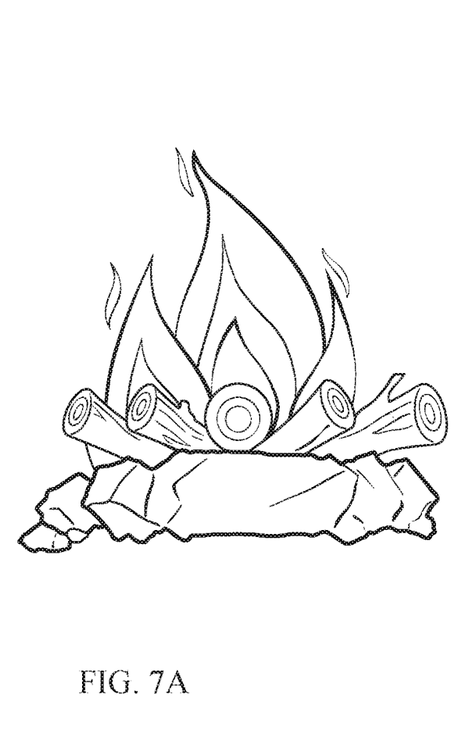
FIGS. 7A-C illustrates an example scale of various production models of the present invention.
Figure 7B:
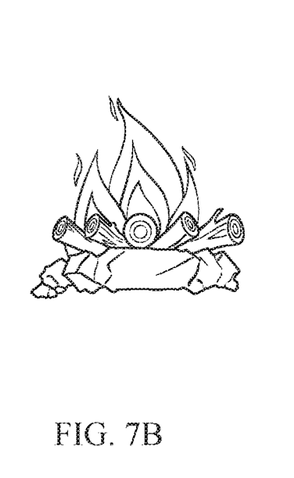
Figure 7C:
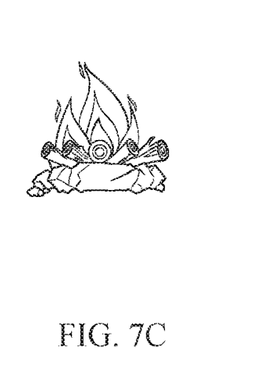

An example of the scale between the different models is depicted in FIGS. 7A-C. For example, FIG. 7A depicts the largest campfire unit designed for a themed entertainment facility, while FIG. 7B depicts a premium model meant for home use, and FIG. 7C depicts a kids or toy model for home use.

The above-described operations and embodiments are not intended to be limiting. Rather, the campfire unit may have any suitable combination of the above features and add-ons, depending on the user's preferences.

Small-Scale Version

In one embodiment of the present invention, the campfire unit is designed for home-use. The home-use version may have any of the above described special effects systems, including fog and UV lighting. The home-use version would at least include the campfire unit with the ability to download content by connecting to Alexa, Google Home, a Smart TV, or other similar device, by WiFi or other suitable mechanism. This allows the home-use version to have new inserts and content over time. The home-use version of the campfire unit may provide a table-top, in-the-round experience to hear stories and content downloaded or streamed from Amazon, Netflix, a Roku, or a Smart TV, etc. As described above, the home-use version may connect to musical devices and Sonos® or other stereo systems to play content. The home-use version of the campfire unit may be voice activated.

In one example, the present invention can have a small projection device inside the campfire unit 100 that allows adding shadow effects, custom features, and other storytelling elements that project on the walls or other suitable surface. The present invention may have a backup program that allows it to operate as a simple night light, star projection, story projection on the walls, night time songs, or outdoor sounds of crickets, owls, wind blowing, etc. The present invention may also have a wake-up mode for morning alarm clocks.

Other retail products may be associated and used with the present invention for supporting storytelling, including shadow puppets, haunted masks for ghost stories, or objects to play games. For example, a campfire unit may be equipped with UV lighting effect and a user may hold a fake marshmallow or other suitable object over the campfire unit to reveal a code or other clue for a game.

The present invention may operate according to a scavenger hunt version that plays like a game. For example, the campfire unit may be associated with a certain number of "logs," similar to the Log In devices described above. Parents, other kids, grandparents, teachers, or other suitable person can place the "logs" around a house, classroom, or other suitable space. The campfire unit may determine which "logs" are missing and describe them to users of the campfire unit. The users (kids) of the campfire unit may then go and find the hidden "logs" and bring them back to the campfire unit. When brought back to the campfire unit, the "log" may talk, come to life, or otherwise respond to being back in proximity with the campfire unit. The campfire unit may also activate in response to the "log" being returned and provide a response to the user who brought back the "log." Beyond logs, the system may interact with relatable products, both real and virtual, such as fairies, animals, collectibles, bugs, magical items, and cooking items (e.g., hot dogs or other suitable food item). In addition to products such as those identified above, users can wear costumes, tribal items, hats, jewelry, blasters, gloves, or other suitable clothing, and the system will recognize the clothing and integrate it into the experience.

The present invention may also assign people roles to play in a game, song, or story and may have kids choose which part they want to play. The campfire unit of the present invention knows who the users are (by location or by name) and initiates each user's role as the story, game, event plays. Any suitable technology, such as scanners, facial or biometric recognition software, fingerprint scanning, proximity sensors, cell phone signals, Bluetooth, radio frequency identification device (RFID) sensors, cameras, contactless sensors, audio sensors, and the like may be incorporated into or connected to the campfire unit and used to track and identify the users within the campfire unit's range.

The present invention may also have a party mode for sleep overs and games, sing along and story time. The campfire unit can tell a story or read a poem or other suitable content through whispering to add effect. A user may also record a message on the campfire unit that can be replayed at a later time for another user. This message may contain a recorded message, song, or project an image to leave a special illustrated message.

The present invention can be used to tell stories of family history by allowing someone to completely program an event and have everyone sit around the campfire and listen. For example, someone could pre-record a story that could be played by the campfire unit according to the present invention. The campfire unit of the present invention could also be used to add pictures, music, or other audio/visual effects to go along with the pre-recorded story.

The campfire unit may interface with specific apps that are created to allow users to download a photo, song, presentation, game, etc. and play it for the other users in the range of the campfire unit.

The campfire unit may be smart and has a memory to store and replay experiences (instant replay). In particular embodiments, memory includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory may include one or more memories, where appropriate. This disclosure contemplates any suitable memory.

A user may also purchase different items for use with the campfire unit. For example, branded kits that major brands such as Disney, Hasbro, or new movies, tv shows, apps, stories, books, theatre can overlay so users can tell stories, sing songs, and connect to movies, books, and other media to have similar events happening as a story unfolds. For example, when characters in movie are singing, the campfire according to the present invention, starts up and sings along. The present invention can also activate puppets, stuffed animals, toys and retail products to join or take part in role playing games. A cauldron could also be used with the campfire unit to add special experiences for making potions or creating new kinds of storytelling around seasons or holidays. Once the cauldron is connected to the campfire unit, the campfire unit will activate, recognize the cauldron, and ask a user to find ingredients to make a potion or play a special game.

Log In devices, toys or other elements can connect virtually, digitally or physically to the campfire unit of the present invention and a user can bring a product to the campfire to use with it. These devices can come as an option, add-on, or with the units. Each device may have a special sound that is recognized by the campfire unit, as well by tone or way it is positioned. For example, it can be triggered through movement or gravity switch to send a signal to the campfire. In another example, geo-location, global positioning satellite, wireless triangulation, camera tracking, or other suitable technology can be used to determine a position of the Log In device relative to the campfire unit. These devices may be sold with the unit or separately in a package. These allow each user to download their information/imagery, media, their phone, other information about themselves or what they want to share including photo and visual capture.

In one example, these Log In devices looks like an actual log, but may take any other suitable form. A Log In device receives and send signals through technology to know who each unique user is based on its shape, unique id, position or inputted information. This log is then placed on the campfire, held by the user or in range of the campfire. It then transfers that information to the campfire device or is "seen" heard. A user may be visually recognized by the campfire unit, as described above, or the Log In device may have Bluetooth embedded tracking technology such that the campfire unit can recognize that the user is bringing the device to the campfire unit.

In one example the user may carry their Log In device from their home to a cinema or other location equipped with a campfire unit, which may recognize the Log In device and provide an extended version of the experience to the user.

The present invention can also have specific elements to hold marshmallows and cook using a bulb or some kind of safe heating element to cook marshmallows or selected edible elements that are easily bake or only required to be slightly heated. The present invention can also be used with fake marshmallows to roast on the fire, similar to a magic wand that interacts with the campfire unit.

The home-version embodiment of the present invention can be packaged with play-alongs (such as embedded or trackable via augment reality toys) including, but not limited to, characters, shadow makers, simple marshmallows and grilling toys for pretend play. This embodiment may also come with roleplay costumes and kits, especially for kids playing around the campfire, so that users can play the part of the story or experience being deployed by the campfire unit.

In one embodiment, the small-scale version may be a less expensive and/or toy model. In this embodiment, the present invention may have additional features including the ability to toast (using a child safe element) or lightly bake a marshmallow or other edibles. The present invention may have added elements, or it may come with a toy, kit, or product, including different ways to dress a marshmallow, sprinkles and cooking ideas for making special marshmallow edibles. The present invention can also have other edible ingredients, much like an Easy Bake Oven. The present invention can come with an add-on special toasting device that holds the marshmallow or other edibles and supports safely heating ingredients. It can have a special dish holder that allows a user to heat and then dip the edibles the user warmed.

The retail product/kids' product may also focus on photo sharing, singing songs, telling stories and connecting to other home devices to support apps that help run new, fun programs. The present invention has the ability to communicate with smart TV and computers, wireless and phone apps allowing kids around the campfire to select programs they want to run, invent their own stories, sing songs that allow different folks to sing. The present invention may communicate with smart TVs, computers, or other devices using WiFi, Bluetooth, or similar technology or through other suitable I/O or communication interface of the campfire unit 100.

This toy version may be for indoor use only and be battery operated. It may have the ability to use sound and light effects and download stories and songs to project to the user(s). The toy version may operate as a simple night light and may have the UV lighting feature described above.

Large-Scale Version

In one embodiment of the present invention, the campfire unit is designed for large-scale use, such as in a theater, resort, or amusement park, and provides a new way of telling stories and a new form of immersive entertainment as it provides storytelling in an interactive way. In one example, the large-scale version may be installed in a theater to provide a theater in-the-round experience and deliver distributed content. The campfire unit may replace a traditional projection system or be added to provide additional functionality to an existing projection system.

The large-scale version of campfire unit according to the present invention could have rumbling or physical effects that shake, roll and rattle the floor, a seat, a pillow, a bed, a tent structure, etc. In another example, the unit could be attached to a rumble seat.

Figure 3:
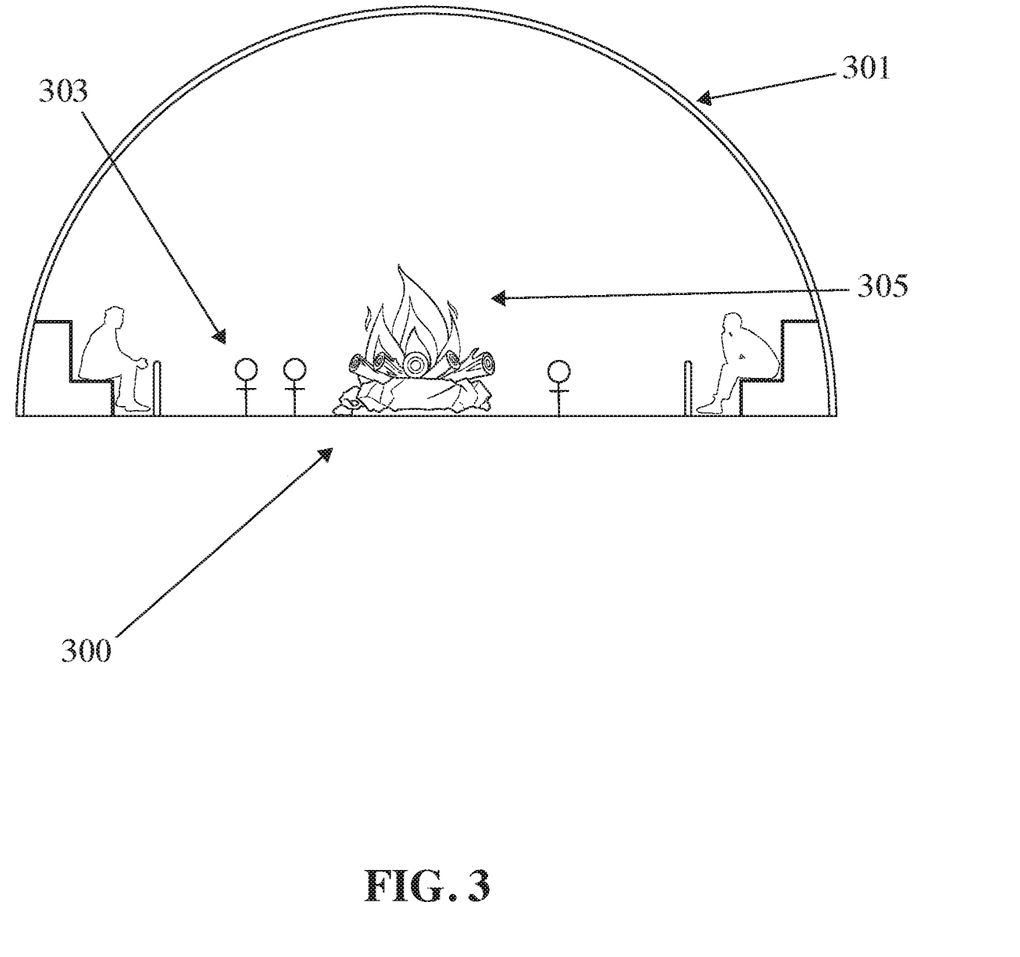
FIG. 3 illustrates an example special effects generating system for an immersive 360° dome theater storytelling experience in accordance with a non-limiting embodiment of the present disclosure.
Figure 4:
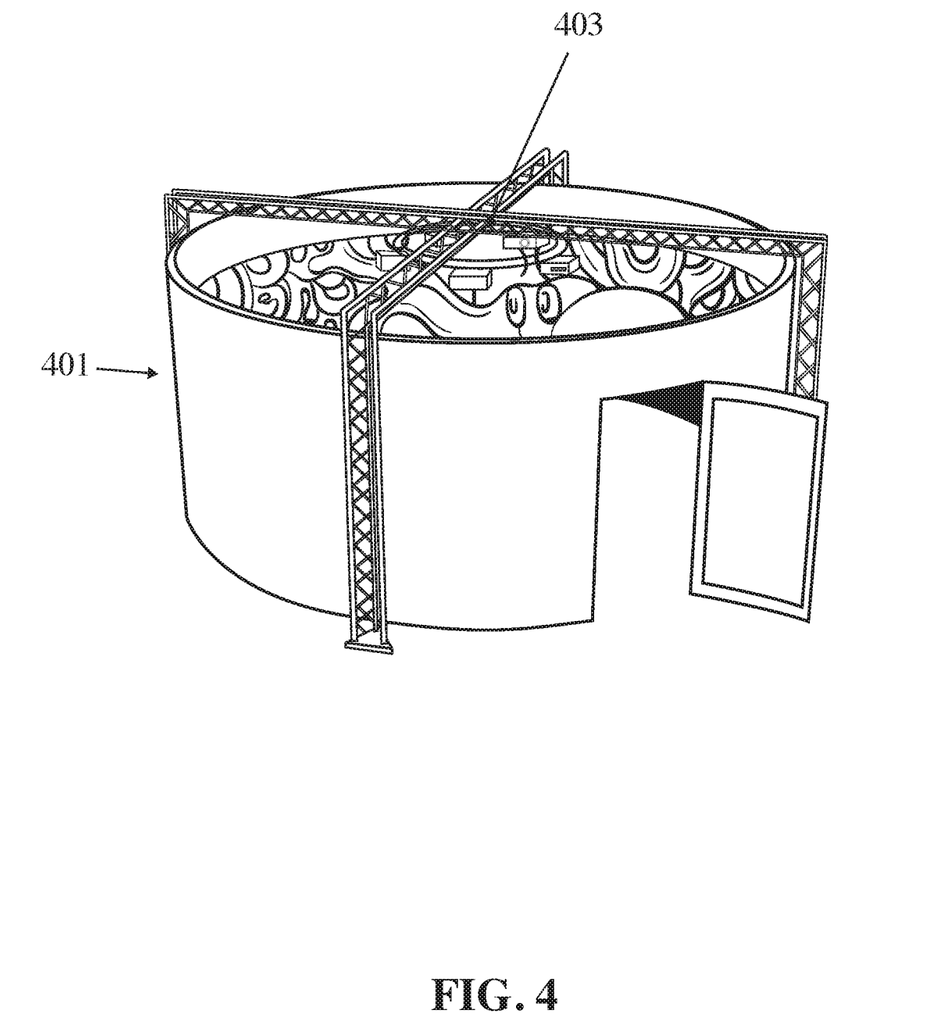
FIG. 4 illustrates an example special effects generating system for an immersive 360° storytelling experience in accordance with a non-limiting embodiment of the present disclosure.

The large-scale experience may use multiple effects as well effects unique to attractions in theme/location-based parks. An example of the large-scale attraction with dome surrounds to complete the 360° experience is depicted in FIG. 3. The large-scale attraction may include campfire unit 300, dome theater 301, bands to interface with special effects 303, and special effects 305. Special effects 305 may include steam or other projection content. Normal and high-powered projector system can be used to turn the surface of the dome theater 301 into a huge screen or layered digital content. The campfire unit 300 can use its computing power to enable live streaming from a variety of sources allowing the projections to be instantaneous. They can be curated from material/media content already generated or even user generated material project real time images on surfaces including props, themed items, water curtains, fog, walls, ceilings floors and even people. The system can project onto the full surface of the dome theater 301. Another example with sophisticated projection systems is depicted in FIG. 4 with a 360° enclosure 401 and projection system 403. The projection system 403 can be installed to similarly render content onto the surfaces of the 360° enclosure 401.

The large-scale theatrical version can be sold as an attraction and used at theme parks and resorts. This embodiment may have additional technology causing 4D effects (like a dark ride only in a small space and using very robust special effects systems).

In this embodiment, the previously described Log In devices could also be used. These may be rented, given to participants, purchased, or borrowed. The Log In devices would have an embedded or unique technology that knows the identity of the user of the device.

In one embodiment, the campfire unit of the present invention may be used in a Yurt or tent-like structure to bring 10-15 or any suitable number of people together in-the-round to take part in an immersive storytelling experience. The campfire unit provides story-led technology and experience by blending Live Action Roleplay (LARP), Virtual Reality (VR), design-thinking, and immersive storytelling with an in-the-round, 360° delivery system that does not require the use of head mounted devices (HMDs). A Yurt or tent-like structure creates an enclosed "dome" (similar to dome theater 301 depicted in FIG. 3) for projection, music, sound, vibration, scent interactions, and other special effects, to be generated by the campfire unit to provide a collective story experience. Users may enter the Yurt or tent-like structure and sit around the campfire unit of the present invention. Before entering, each user may be provided with a Log In device, as described above. Each user may introduce themselves through a pose, gesture, or a few words, 'log in' to the campfire unit, and place their Log In device on the campfire unit.

Thus, a user may carry a special "log" or another device providing image recognition of the user as a player with the campfire unit. A previously used or new campfire unit can recognize the user by their log or through facial or other recognition when the user comes in range or contact with the campfire unit, as described above.

In an amusement park setting, a user may be asked to find or hunt for certain items around the park. The user may keep track of items found around the park through their "log" or through recognition software, such as a haptic or touch-based sensor, in each of the found items. When the user returns to the campfire unit or one of multiple campfire units throughout the park, the campfire unit may recognize the particular user and which items that user found. The campfire unit may then add those items to the user's inventory as part of a game or add it to the ongoing story being told.

The technology powering the campfire unit is a combination of toolsets that center around a physical projection system. The campfire unit provides a platform to provide visuals and sound effects to tell a story. For example, 'flames' may heighten, the heat of the 'fire' may intensify, 'smoke' may rise and fall around the campfire. The campfire unit may lead participants in a selected song or beat by signaling through familiar sounds or music. The 'fire' may react more the more people participate. The story and experience of using the present invention may include real-time image capture of participants in the range of the campfire unit and providing a pre-rendered, animated, surround-sound and interactive media projection sharing a story. The communications and projections may be part of an operator-led experience such that they are captured and played back at the end of the story using a tracking and image recognition system that orchestrates real-time imagery through managed content, i.e., participants' shadow or name in real-time play. For example, behind-the-scenes technology may be used to capture images for incorporation and use later in the story.

In one example, the campfire unit uses camera tracking or other artificially intelligent software to capture a verbal response or gesture from each of the users of the campfire unit. These captured personalized responses may be incorporated into the cinematic presentation of the campfire unit. In another example, each user of the campfire unit may be presented with a "log" and interact with portals formed in the campfire unit. This interaction may take place through a website, an app, or other suitable technology. Through interaction with the portals, personalized images and information about each user may be captured and stored on each user's customized "log." Each user can then bring their customized "log" to the campfire unit and 'log in,' so that the technology of the campfire unit recognizes the users.

A 4D theatrical experience according to the present invention may use tools, including vibration seats and sound, light, air/fan technologies, to deliver an immersive experience. Projection mapping technology according to the present invention uses tools from architecture, psychology, behaviorism, philosophy, and sound design to provide a 4D sensory experience. The present invention may use information captured about the faces and bodies of participants to board, acclimatize, and provide attention cues through sound and audio triggers.

Figure 5:
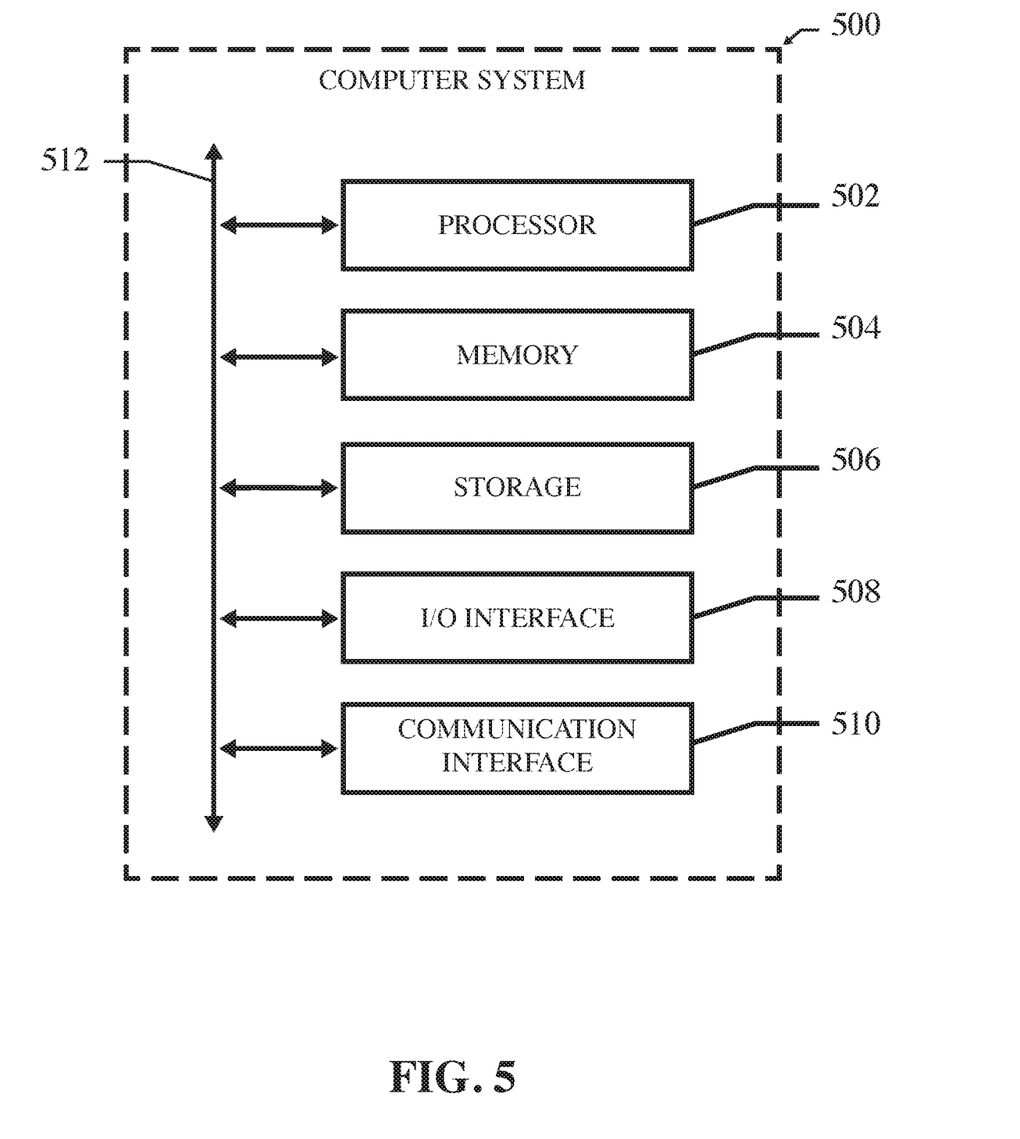
FIG. 5 illustrates an example computer system.

Both small and large-scale versions may operate using a computer system 500, as described above and in more detail as follows. As described above, in particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement. As example and not by way of limitation, computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system may include one or more computer systems; be unitary or distributed; span multiple locations (e.g., where multiple campfire units are spaced throughout an amusement park); span multiple machines; span multiple data centers; or reside in a cloud, which may include one or more cloud components in one or more networks.

In particular embodiments, processor includes hardware for executing instructions, such as those making up a computer program. As an example, and not by way of limitation, to execute instructions, processor may retrieve (or fetch) the instructions from an internal register, an internal cache, memory, or storage; decode and execute them; and then write one or more results to an internal register, an internal cache, memory, or storage.

In particular embodiments, memory includes main memory for storing instructions for processor to execute or data for processor to operate on. As an example, and not by way of limitation, computer system may load instructions from storage or another source (such as, for example, another computer system) to memory. Processor may then load the instructions from memory to an internal register or internal cache. To execute the instructions, processor may retrieve the instructions from the internal register or internal cache and decode them. During or after execution of the instructions, processor may write one or more results (which may be intermediate or final results) to the internal register or internal cache. Processor may then write one or more of those results to memory. In particular embodiments, processor executes only instructions in one or more internal registers or internal caches or in memory (as opposed to storage or elsewhere) and operates only on data in one or more internal registers or internal caches or in memory (as opposed to storage or elsewhere). One or more memory buses (which may each include an address bus and a data bus) may couple processor to memory. Bus may include one or more memory buses, as described below. In particular embodiments, one or more memory management units (MMUs) reside between processor and memory and facilitate accesses to memory requested by processor. In particular embodiments, memory includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory may include one or more memories, where appropriate. Although this disclosure describes and illustrates particular memory, this disclosure contemplates any suitable memory.

In particular embodiments, storage includes mass storage for data or instructions. As an example, and not by way of limitation, storage may include a hard disk drive (HDD), a floppy disk drive, flash memory, an optical disc, a magneto-optical disc, magnetic tape, or a Universal Serial Bus (USB) drive or a combination of two or more of these. Storage may include removable or non-removable (or fixed) media, where appropriate. Storage may be internal or external to computer system, where appropriate. In particular embodiments, storage is non-volatile, solid-state memory. In particular embodiments, storage includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage taking any suitable physical form. Storage may include one or more storage control units facilitating communication between processor and storage, where appropriate. Where appropriate, storage may include one or more storages. Although this disclosure describes and illustrates particular storage, this disclosure contemplates any suitable storage.

In particular embodiments, I/O interface includes hardware, software, or both, providing one or more interfaces for communication between computer system and one or more I/O devices. Computer system may include one or more of these I/O devices, where appropriate. One or more of these I/O devices may enable communication between a person and computer system. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces for them. Where appropriate, I/O interface may include one or more device or software drivers enabling processor to drive one or more of these I/O devices. I/O interface may include one or more I/O interfaces, where appropriate. Although this disclosure describes and illustrates a particular I/O interface, this disclosure contemplates any suitable I/O interface.

In particular embodiments, communication interface includes hardware, software, or both providing one or more interfaces for communication (such as, for example, packet-based communication) between computer system and one or more other computer systems or one or more networks. As an example, and not by way of limitation, communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface for it. As an example, and not by way of limitation, computer system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system may include any suitable communication interface for any of these networks, where appropriate. Communication interface may include one or more communication interfaces, where appropriate. Although this disclosure describes and illustrates a particular communication interface, this disclosure contemplates any suitable communication interface.

In particular embodiments, bus includes hardware, software, or both coupling components of computer system to each other. As an example and not by way of limitation, bus may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An augmented reality apparatus for creating an immersive environment comprising:
   one or more image projection screens or walls;
   a campfire simulation unit comprising one or more image projection systems capable of projecting images on the one or more projection screens or walls, one or more lights, one or more speakers, one or more communication interfaces, and one or more associated objects, wherein the campfire simulation unit is positioned so as to be at least partially surrounded by the one or more image projection screens or walls;
   one or more computer systems comprising one or more processors and one or more receivers and transceivers;
   one or more sensors and one or more microphones, wherein the one or more sensors or microphones are used by the one or more processors to detect the presence of one or more individuals or objects within the immersive environment, wherein a detected presence causes the one or more image projection systems and one or more speakers to output augmented reality storytelling, educational, musical, or gaming content.

2. The augmented reality apparatus of claim 1, wherein the associated object consists of a simulated log structure, which contains embedded information or is associated with information stored in a database accessible to the simulated campfire computer system.

3. The augmented reality apparatus of claim 1, wherein the sensors comprise a RFID sensor, and the associated object contains an RFID chip.

4. The augmented reality apparatus of claim 1, wherein outputting augmented reality storytelling, educational, musical or gaming content comprises incorporating images, voice recordings, or preferred characters associated with the one or more individuals.

5. The augmented reality apparatus of claim 1, wherein the one or more sensors of the campfire simulation unit can detect signals transmitted by handheld devices, such as a smartphone, and the one or more processors of the campfire simulation unit can alter the audio or visual storyline to be presented.

6. The augmented reality apparatus of claim 1, wherein a tracking system is employed to detect the presence or movement of the one or more individuals, and based on said presence or movement, the one or more processors of the campfire unit can alter an audio or visual storyline to be presented.

* * * * *